(12) United States Patent
Lee

(10) Patent No.: US 7,181,327 B2
(45) Date of Patent: Feb. 20, 2007

(54) METHOD AND APPARATUS FOR CONTROLLING FLUID SUPPLY TO A CLUTCH PACK OF AN AUTOMATIC TRANSMISSION

(75) Inventor: Hee Yong Lee, Suwon (KR)

(73) Assignee: Hyundai Motor Company, Seoul (KR)

(*) Notice: Subject to any disclaimer, the term of this patent is extended or adjusted under 35 U.S.C. 154(b) by 381 days.

(21) Appl. No.: 10/750,681

(22) Filed: Dec. 31, 2003

(65) Prior Publication Data

US 2004/0209737 A1 Oct. 21, 2004

(30) Foreign Application Priority Data

Apr. 21, 2003 (KR) .................. 10-2003-0025105

(51) Int. Cl.
*G06F 17/00* (2006.01)

(52) U.S. Cl. .................. 701/51; 701/53; 701/63; 701/66; 701/67; 477/70; 477/76; 477/166; 477/169; 477/180

(58) Field of Classification Search .................. None
See application file for complete search history.

(56) References Cited

U.S. PATENT DOCUMENTS 5,088,353 A * 2/1992 Yoshida .................. 477/92
5,853,076 A * 12/1998 McKee et al. .................. 192/87.14
5,910,175 A * 6/1999 Malson .................. 701/57
6,216,074 B1 * 4/2001 Hillman et al. .................. 701/51

FOREIGN PATENT DOCUMENTS

| JP | 10-169764 | 6/1998 |
|---|---|---|
| JP | 11-051167 | 2/1999 |
| JP | 11-063196 | 5/1999 |
| JP | 2001-141045 | 5/2001 |
| JP | 2002-243029 | 8/2002 |

* cited by examiner

*Primary Examiner*—Thomas Black
*Assistant Examiner*—Marie A Weiskopf
(74) *Attorney, Agent, or Firm*—Morgan Lewis & Bockius LLP

(57) ABSTRACT

When an engine is restarted after a predetermined period of being stopped oil is supplied to a clutch pack for a 2–3 and/or 3–4 shift while a transmission is engaged in the first speed for the first time since starting. The amount of oil drained during the predetermined period of being stopped is complemented in advance such that shift quality of a first 2–3 and/or 3–4 shift is enhanced.

6 Claims, 3 Drawing Sheets

METHOD AND APPARATUS FOR CONTROLLING FLUID SUPPLY TO A CLUTCH PACK OF AN AUTOMATIC TRANSMISSION

CROSS-REFERENCE TO RELATED APPLICATIONS

This application claims priority to Korean Application No. 10-2003-0025105, filed Apr. 21, 2003, the disclosure of which is incorporated fully herein by reference.

1. Field of the Invention

Generally, the present invention relates to an automatic transmission. More particularly, the present invention relates to a method and apparatus for controlling oil supply to a clutch pack of an automatic transmission.

2. Background of the Invention

A typical automatic transmission (AT) for a vehicle includes a torque converter and a powertrain which is a gear mechanism connected to the torque converter for multi-speed driving. The AT also includes a clutch pack (and a hydraulic control system thereof) for selectively operating at least one operational element in the powertrain. In order to realize a specific target shift-speed appropriate for a current vehicle driving condition, such a clutch pack engages a clutch corresponding to the shift-speed with use of hydraulic pressure supplied from an oil pump.

When the vehicle is parked for a certain period of time with its engine turned off (i.e., the oil pump is also stopped), the oil that activates the clutch in the clutch pack drains to an oil pan. Therefore, when the clutch is operated, i.e., when a specific speed is engaged, with the engine being newly started after being stopped for a certain period of time, the amount of hydraulic fluid required for proper operation may not be present. An amount of hydraulic fluid required for such operation greatly varies depending on how many times such engagements have occurred, e.g., on whether it is the first or the second engagement after the engine is newly started.

However, according to the typical method, hydraulic fluid for the automatic transmission (ATF) is controlled regardless of whether or not it is the first engagement of the shift-speed after the engine is newly started. Therefore, when the clutch is operated for the first time after the engine is newly started, mechanical force for engaging the clutch for the target shift-speed becomes insufficient and a shift-flare effect may be generated. Shift flare is a phenomenon of run up caused by a delayed clutch engagement.

In order to rectify such a problem, a first fill time, that is used for a first engagement of the clutch after the engine is started, may be used to determine a value for the next engagement of the clutch. However, such a preset value may not be optimal with respect to various engine stopping periods and ambient temperatures, so the shift-flare and/or shock at a first shifting operation of second to third speeds and/or third to fourth speeds may still occur due to non-optimized ATF pressure.

The information disclosed in this Background of the Invention section is only for enhancement of understanding of the background of the invention, and should not be taken as an acknowledgement or any form of suggestion that this information forms the prior art that is already known to a person skilled in the art.

SUMMARY OF THE INVENTION

An embodiment of the present invention provides a method and apparatus for controlling fluid supply to a clutch pack of an automatic transmission such that shift-shock is reduced and the shift quality is enhanced.

An exemplary apparatus for controlling fluid supply to a clutch pack of an automatic transmission according to an embodiment of the present invention includes a detecting unit for detecting an operating state of the vehicle and abnormal operation thereof. A control unit for determining if an output of the detecting unit satisfies a pre-fill time control condition and thereby for controlling fluid supply to the clutch pack of the automatic transmission on the basis of a pre-fill time calculated on the basis of the output of the detecting unit. Also, a fluid supply unit for supplying fluid to the clutch pack under the control of the control unit.

In a further embodiment, the detecting unit includes an ignition detector for detecting running of the engine and an engine speed detector for detecting a current engine speed. Also included is a turbine speed detector for detecting a turbine speed of the automatic transmission that is input to a shift mechanism of the transmission and an output-shaft speed detector for detecting an output-shaft speed of the shift mechanism of the transmission. A fluid temperature detector for detecting a fluid temperature, the fluid being used for forming pressure of the clutch pack to engage the clutch and a throttle opening detector for detecting a throttle valve opening are also included. Furthermore, a malfunction detector for detecting a malfunction of the vehicle is included.

In a still further embodiment, the pre-fill time control condition includes the automatic transmission is in a first speed for the first time after the engine is restarted. The engine speed is greater than a predetermined engine speed and the engine speed is greater than a turbine speed. The output-shaft speed of the shift mechanism is greater than a predetermined output speed and the throttle valve opening is greater than a predetermined opening. A difference between fluid temperatures of before the engine is stopped and after the engine is restarted is greater than a predetermined difference and a malfunction of the vehicle is not detected.

It is preferable that the pre-fill time is calculated on the basis of the equations: $1st\_Pre\_t_F = (S_C + S_{CL} - S_{CM\_OCP}) \times K_E \times K_{T2} + \Delta t_{F\_Pre}$; and $nxt\_Pre\_t_F = (S_C + S_{CL} - S_{CM}) \times K_E \times K_{T2}$, wherein: $1st\_Pre\_t_F$ denotes a first pre-fill time; $nxt\_Pre\_t_F$ denotes the next pre-fill time that occurs after the first pre-fill time; $S_C$ denotes a base fill time; $S_{CL}$ denotes a learned value for the fill time; $S_{CM\_OCP}$ denotes a marginal pre-fill time; SCM denotes a marginal time for the clutch fill time; $k_E$ denotes a correction coefficient for engine speed; kT2 denotes a correction coefficient for fluid temperature; and $\Delta t_{F\_Pre}$ denotes a pre-fill time according to draining of the fluid, the pre-fill time being proportional to a period during which the engine remains stopped.

An embodiment of the method for controlling fluid supply to a clutch pack of an automatic transmission includes detecting an operating state of the vehicle after the engine is restarted and determining if the operating state satisfies a pre-fill time control condition. The embodiment also controls, when the operating state satisfies the pre-fill time control condition and fluid supply to the clutch pack of the automatic transmission on the basis of a pre-fill time calculated on the basis of the operating state. Furthermore, the method determines, during the controlling of the fluid supply to the clutch pack, if a pre-fill control release condition is satisfied and stopping, when the pre-fill control release condition is satisfied, the controlling of the fluid supply to the clutch pack and performing normal hydraulic control of the transmission.

In a further embodiment, the pre-fill time control condition includes: the automatic transmission is in a first speed for the first time after the engine is restarted; the engine speed is greater than a predetermined engine speed; the engine speed is greater than a turbine speed; the output speed of the shift mechanism is greater than a predetermined output speed; the throttle valve opening is greater than a predetermined opening; a difference between fluid temperatures of before the engine is stopped and after the engine is restarted is greater than a predetermined difference; and a malfunction of the vehicle is not detected.

In a still further embodiment, the pre-fill time is calculated on the basis of the equations: $1st\_Pre\_t_F=(S_C+S_{CL}-S_{CM\_OCP})\times K_E\times K_{T2}+\Delta t_{F\_Pre}$; and $nxt\_Pre\_t_F=(S_C+S_{CL}-S_{CM})\times K_E\times K_{T2}$, wherein: $1st\_Pre\_t_F$ denotes a first pre-fill time; $nxt\_Pre\_t_F$ denotes the next pre-fill time that occurs after the first pre-fill time; $S_C$ denotes a base fill time; $S_{CL}$ denotes a learned value for the fill time; $S_{CM\_OCP}$ denotes a marginal pre-fill time; $S_{CM}$ denotes a marginal time for the clutch fill time; $k_E$ denotes a correction coefficient for engine speed; $k_{T2}$ denotes a correction coefficient for fluid temperature; and $\Delta t_{F\_Pre}$ denotes a pre-fill time according to draining of the fluid, the pre-fill time being proportional to a period during which the engine remains stopped.

BRIEF DESCRIPTION OF THE DRAWINGS

The accompanying drawings, which are incorporated in and constitute a part of the specification, illustrate an embodiment of the invention, and, read together with the description, serve to explain the principles of the invention in which.

DETAILED DESCRIPTION OF PREFERRED EMBODIMENTS

Figure 1:
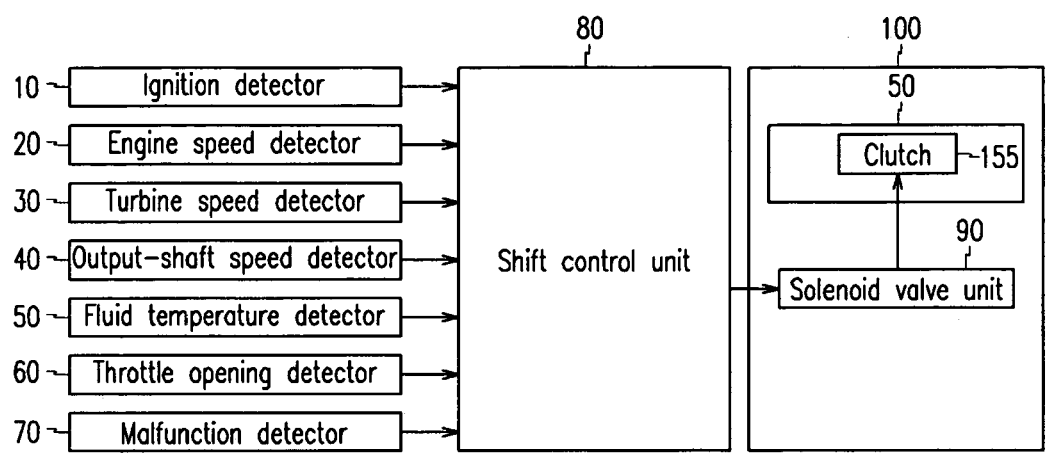
FIG. 1 is a block diagram of an apparatus for controlling fluid supply to a clutch pack of an automatic transmission according to an embodiment of the present invention.

As shown in FIG. 1, an apparatus for controlling fluid supply to a clutch pack 150 of an automatic transmission 100 includes an ignition detector 10, an engine speed detector 20, a turbine speed detector 30, an output-shaft speed detector 40, a fluid temperature detector 50, a throttle opening detector 60, a malfunction detector 70 for detecting a malfunction of the vehicle, a shift control unit 80, and a solenoid valve unit 90.

The ignition detector 10 detects information relating to whether the engine is turned on/off, i.e., whether the engine is running or not, and accordingly sends a signal relating the information to the shift control unit 80. The engine speed detector 20 detects, by detecting angular positions of a crankshaft of the engine, a current engine speed Ne, and accordingly sends a signal relating the engine speed Ne to the shift control unit 80. The turbine speed detector 30 detects a turbine speed Nt of the automatic transmission 100 that is input to a shift mechanism of the transmission 100, and accordingly sends a turbine speed Nt signal to the shift control unit 80.

The output-shaft speed detector 40 detects an output-shaft speed No of the shift mechanism of the transmission 100, and accordingly sends an output-shaft speed No signal to the shift control unit 80. The output-shaft speed No may also be calculated by multiplying the turbine speed Nt by a shift-ratio of a current shift-speed of the transmission 100. The fluid temperature detector 50 detects a temperature of automatic transmission fluid (ATF) that is used for forming pressure of the clutch pack 150 to engage a clutch 155, and accordingly sends a fluid temperature signal to the shift control unit 80.

The throttle opening detector 60 detects an opening of the throttle value that operates in connection with a driver's operation of an accelerator pedal and accordingly sends a throttle opening signal to the shift control unit 80. The malfunction detector 70 monitors overall functioning of the vehicle having an automatic transmission 100, and accordingly sends the monitored results to the shift control unit 80.

The shift control unit 80 determines if a pre-fill time control condition is satisfied on the basis of output values of the detectors. When the pre-fill control condition is satisfied, the shift control unit 80 controls oil supply to the clutch pack 150 (in more detail, a pre-fill time for the clutch 155) on the basis of drained oil determined from the output values of the detectors.

The solenoid valve unit 90 is for controlling hydraulic pressure supply to the clutch pack 150 of the automatic transmission 100, and is obvious to a person of ordinary skill in the art.

The pre-fill time control condition is set as follows, the automatic transmission 100 should be in a first speed for the first time after the engine is restarted after a stopping period of more than a predetermined period. Next, the engine speed Ne should be greater than a predetermined engine speed Ne1. Then the engine speed Ne should be greater than a turbine speed Nt and the output-shaft speed No of the shift mechanism should be greater than a predetermined output speed No1. The throttle valve opening Th should be greater than a predetermined opening Th1 and a fluid temperature difference GAP should be greater than a predetermined temperature difference Temp1. Furthermore, a malfunction of the vehicle should not be detected.

Here, the fluid temperature difference GAP denotes an ATF temperature difference between before the engine is stopped and after the engine is restarted. In addition, when the pre-fill time control condition is satisfied, fill time for coping with drained ATF is calculated according to the following equation 1.

$$1st\_Pre\_t_F=(S_C+S_{CL}-S_{CM\_OCP})\times K_E\times K_{T2}+\Delta t_{F\_Pre};$$
and
$$nxt\_Pre\_t_F=(S_C+S_{CL}-S_{CM})\times K_E\times K_{T2}, \quad \text{[Equation 1]}$$

In the above equation 1:

$1st\_Pre\_t_F$ denotes a first pre-fill time;

$nxt\_Pre\_t_F$ denotes the next pre-fill time that occurs after the first pre-fill time;

$S_C$ denotes a base fill time;

$S_{CL}$ denotes a learned value for the fill time;

$S_{CM\_OCP}$ denotes a marginal pre-fill time;

$S_{CM}$ denotes a marginal time for the clutch fill time;

$k_E$ denotes a correction coefficient for engine speed;

$k_{T2}$ denotes a correction coefficient for fluid temperature; and $\Delta t_{F\_Pre}$ denotes a pre-fill time according to draining of the fluid, the pre-fill time being proportional to a period during which the engine has remained stopped.

The marginal pre-fill time $S_{CM\_OCP}$ denotes a marginal portion of a total fill time for the clutch 155 that can be applied during the first speed. The marginal time $S_{CM}$ denotes a marginal time of a total fill time for the clutch 155 that can be applied during 2–3 shift controlling. In addition, the first pre-fill time 1st_Pre_$t_F$ is controlled to be limited within a predetermined value. That is, when the first pre-fill time 1st_Pre_$t_F$ calculated by the above equation 1 is greater than the predetermined value, the first pre-fill time 1st_Pre_$t_F$ is reset to the predetermined value.

The solenoid valve unit 90 directly controls oil supply to the clutch pack 150, under the control of the shift control unit 80 that calculates the pre-fill time according to the above equation. According to a preferred embodiment, the shift-control unit 80 controls the solenoid valve unit 90 to control oil supply to the clutch pack 150 through controlling of such pre-fill time, which is hereinafter described in detail.

Figure 2:
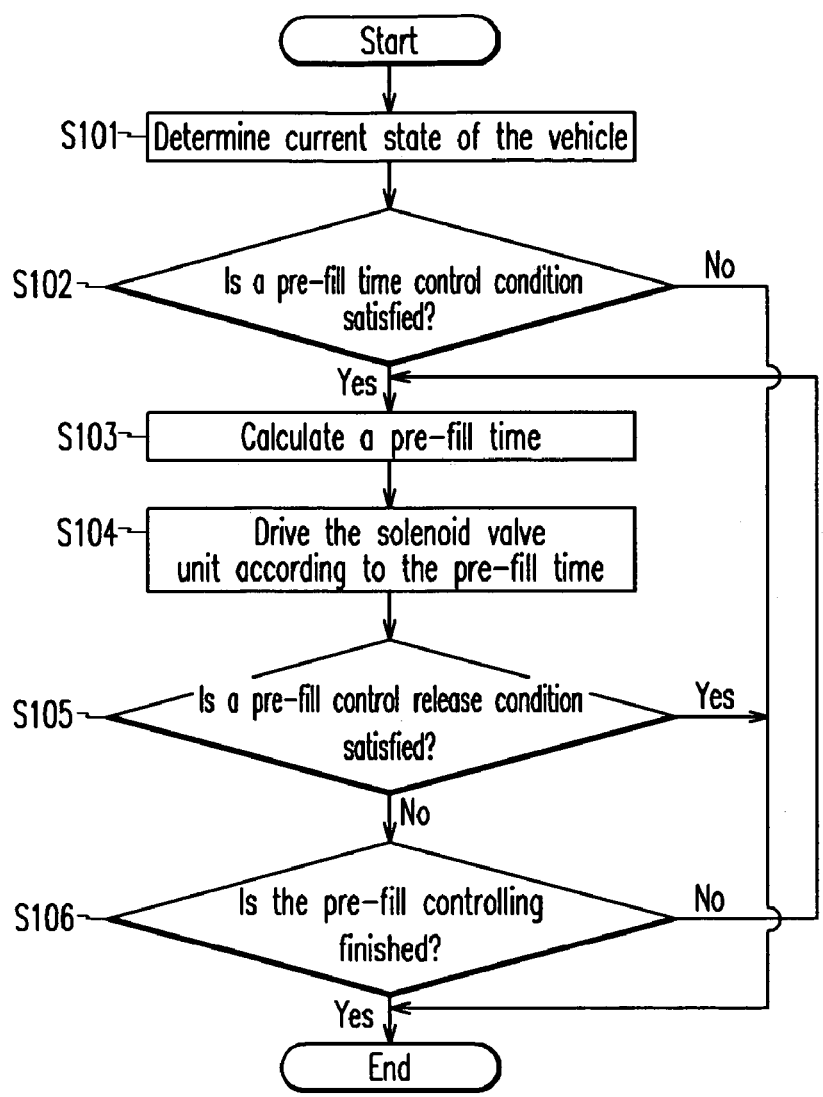
FIG. 2 is a flowchart showing a method for controlling fluid supply to a clutch pack of an automatic transmission according to an embodiment of the present invention.

As shown in FIG. 2, firstly at step S101, the shift control unit 80 determines the current state of the vehicle based on output values of the detectors equipped in the vehicle, when the engine is started. Subsequently at step S1102, the shift control unit 80 determines if a pre-fill time control condition is satisfied on the basis of output values of the detectors.

The pre-fill time control condition is set as follows, the automatic transmission 100 should be in a first speed for the first time after the engine is restarted after a stopping period of more than a predetermined period. Next, the engine speed Ne should be greater than a predetermined engine speed Ne1. Then the engine speed Ne should be greater than a turbine speed Nt. The output-shaft speed No of the shift mechanism should be greater than a predetermined output speed No1, the throttle valve opening Th should be greater than a predetermined opening Th1 and a fluid temperature difference GAP should be greater than a predetermined temperature difference Temp1. Furthermore, a malfunction of the vehicle should not be detected.

When the pre-fill time control condition is not satisfied, the shift control unit 80 does not perform pre-fill controlling of the clutch pack 150. When the pre-fill time control condition is satisfied, the shift control unit 80 calculates, at step S103, a pre-fill time according to the following equation 2 on the basis of the current state of the vehicle.

$$1st\_Pre\_t_F = (S_C S_{CL} - S_{CM\_OCP}) \times K_E \times K_{T2} \Delta t_{F\_Pre};$$
and $$nxt\_Pre\_t_F = (S_C + S_{CL} - S_{CM}) \times K_E \times K_{T2}; \quad \text{[Equation]2}$$

In the above equation 2:

1st_Pre_$t_F$ denotes a first pre-fill time;

nxt_Pre_$t_F$ denotes the next pre-fill time that occurs after the first pre-fill time;

$S_C$ denotes a base fill time;

$S_{CL}$ denotes a learned value for the fill time;

$S_{CM\_OCP}$ denotes a marginal pre-fill time;

$S_{CM}$ denotes a marginal time for the clutch fill time;

$k_E$ denotes a correction coefficient for engine speed;

$k_{T2}$ denotes a correction coefficient for fluid temperature; and $\Delta t_{F\_Pre}$ denotes a pre-fill time according to draining of the fluid, the pre-fill time being proportional to a period during which the engine has remained stopped.

The marginal pre-fill time $S_{CM\_OCP}$ denotes a marginal portion of a total fill time for the clutch 155 that can be applied during the first speed. The marginal time $S_{CM}$ denotes a marginal time of a total fill time for the clutch 155 that can be applied during 2–3 shift controlling. In addition, the first pre-fill time 1st_Pre_$t_F$ is controlled to be limited within a predetermined value. That is, when the first pre-fill time 1st_Pre_$t_F$ calculated by the above equation 2 is greater than the predetermined value, the first pre-fill time 1st_Pre_$t_F$ is reset to the predetermined value.

Figure 3:
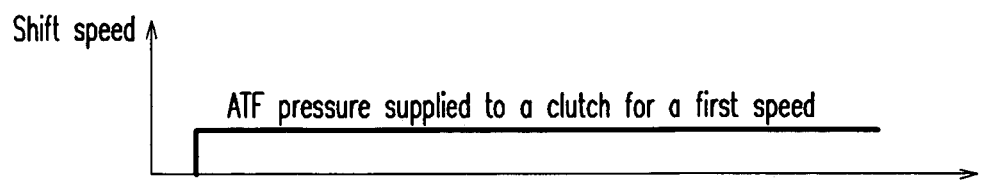
FIG. 3 is a graph for showing a fluid supply state for a clutch for a first speed when the first speed is engaged in an automatic transmission according to an embodiment of the present invention.
Figure 4:
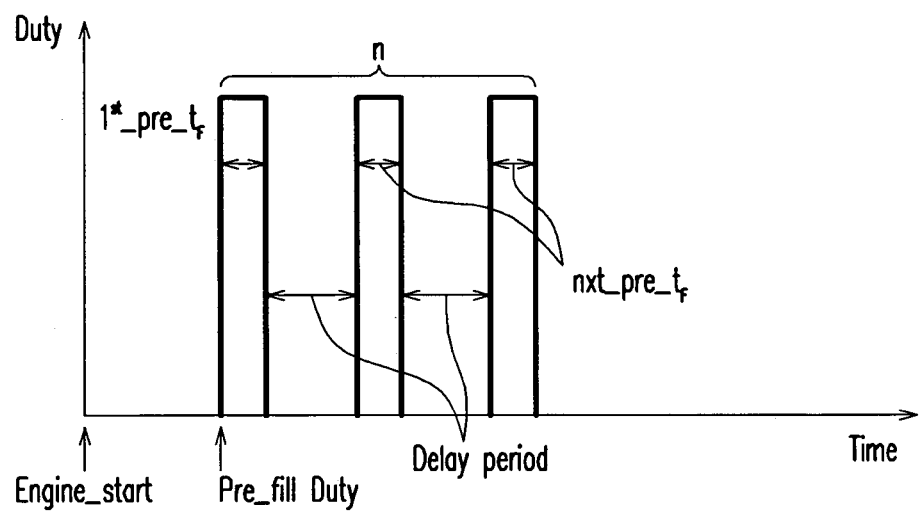
FIG. 4 is a graph for showing a pre-fill control state of a clutch used for a 2–3 shift or a 3–4 shift, the pre-fill control state occurring during the first speed engagement of the transmission according to an embodiment of the present invention.

When a first speed of the transmission 100 is engaged for the first time after the engine is restarted after a long period of being stopped, the shift-speed state (and ATF supply state for a clutch in a clutch pack 150 for the first speed) is formed as shown in FIG. 3. After the ATF is supplied to the clutch for the first speed, pre-fill time relating to a clutch 155 for 2–3 and/or 3–4 shift is controlled according to a duty pattern shown in FIG. 4 and the above equation 2.

Figure 5:
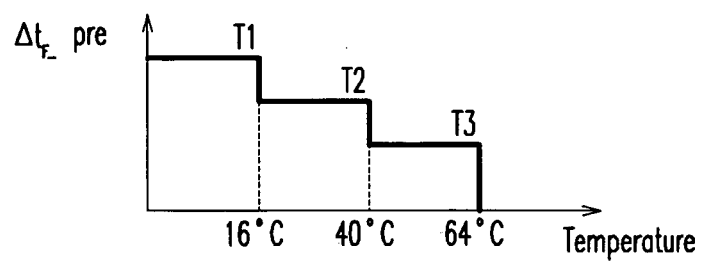
FIG. 5 shows a fluid temperature dependency of the pre-fill time $\Delta t_{F\_Pre}$ according to draining of the fluid according to an embodiment of the present invention.

The pre-fill time $\Delta t_{F\_Pre}$ according to draining of the fluid is calculated dependent on the ATF temperature as shown in FIG. 5. When the calculation of the pre-fill time is finished, the shift control unit 80 drives the solenoid valve unit 90 at step S104 such that the ATF supply to the clutch pack 150 is controlled according to the above equation 2. Therefore, during a first 2–3 shift and/or 3–4 shift, the shift control becomes more stable and shift flare can be obviated.

While such pre-fill controlling is executed, the shift control unit 80 determines, at step S105, if a pre-fill control release condition is satisfied. The pre-fill control release condition includes: change rate (Nti-Nt) of the turbine speed becomes greater than a predetermined reference value N1 or malfunctioning of the vehicle is detected.

When the pre-fill control release condition is satisfied, the shift control unit 80 stops execution of the pre-fill controlling and subsequently returns to normal hydraulic control of the automatic transmission 100. When the pre-fill control release condition is not satisfied, the shift control unit 80 determines, at step S106, if the pre-fill controlling is finished. If the pre-fill controlling is not finished at step S106, the shift control unit 80 returns to the step S103 so as to continue the pre-fill control of the automatic transmission 100. If the pre-fill controlling is finished at step S106, the shift control unit 80 returns to normal hydraulic control of the automatic transmission 100.

In the above description, the inventive concept of the present invention is described in connection with a first pre-fill time control of the automatic transmission 100. However, subsequent pre-fill time control may obviously be embodied by a person of ordinary skill in the art.

As shown above, according to a preferred embodiment of the present invention, by controlling a pre-fill time for a clutch based on a stopping period and/or ATF temperature, appropriately coping with ATF draining that occurs when an engine is stopped is enabled. Therefore, shift-flare that may occur in a 2–3 and/or 3–4 shift is obviated and accordingly shift control of an automatic transmission 100 becomes more stable and shift-quality is enhanced.

The ECU can be realized by one or more processors activated by predetermined software, and the predetermined software can be programmed to perform each step of a fluid supply controlling method according to a preferred embodiment of this invention.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An apparatus for controlling fluid supply to a clutch pack of an automatic transmission of a vehicle having an engine, the apparatus comprising:
    a detecting unit for detecting an operating state of a vehicle and abnormal operation thereof
    a control unit for determining if an output of the detecting unit satisfies a pre-fill time control condition and thereby for controlling fluid supply to a clutch pack of an automatic transmission on a basis of a pre-fill time calculated on the basis of output of the detecting unit; and
    a fluid supply unit for supplying fluid to the clutch pack under control of the control unit;
    wherein the detecting unit comprises:
        an ignition detector for detecting running of an engine;
        an engine speed detector for detecting a current engine speed;
        a turbine speed detector for detecting a turbine speed of the automatic transmission that is input to a shift mechanism of the transmission;
        an output-shaft speed detector for detecting an output-shaft speed of the shift mechanism of the transmission;
        a fluid temperature detector for detecting a fluid temperature, the fluid being used for forming pressure of the clutch pack to engage the clutch;
        a throttle opening detector for detecting a throttle valve opening; and
        a malfunction detector for detecting a malfunction of the vehicle; and wherein the pre-fill time control condition comprises:
            the automatic transmission being in a first speed for the first time after the engine is restarted; and
            a difference between fluid temperatures of before the engine is stopped and after the engine is restarted being greater than a predetermined difference.

2. The apparatus of claim 1, wherein the pre-fill time control condition further comprises:
    the engine speed is greater than a predetermined engine speed;
    the engine speed is greater than a turbine speed;
    the output-shaft speed of the shift mechanism is greater than a predetermined output speed;
    the throttle valve opening is greater than a predetermined opening; and
    a malfunction of the vehicle is not detected.

3. An apparatus for controlling fluid supply to a clutch pack of an automatic transmission of a vehicle having an engine, the apparatus comprising:
    a detecting unit for detecting an operating state of a vehicle and abnormal operation thereof;
    a control unit for determining if an output of the detecting unit satisfies a pre-fill time control condition and thereby for controlling fluid supply to a clutch pack of an automatic transmission on a basis of a pre-fill time calculated on the basis of output of the detecting unit; and
    a fluid supply unit for supplying fluid to the clutch pack under control of the control unit, wherein the pre-fill time is calculated on the basis of the equations:

$$1st\_Pre\_t_F = (S_C + S_{CL} - S_{CM\_OCP}) \times K_E \times K_{T2} + \Delta t_{F\_Pre};$$
    and
    $$nxt\_Pre\_t_F = (S_C + S_{CL} - S_{CM}) \times K_E \times K_{T2},$$

wherein:
    $1st\_Pre\_t_F$ denotes a first pre-fill time;
    $nxt\_Pre\_t_F$ denotes the next pre-fill time that occurs after the first pre-fill time;
    $S_C$ denotes a base fill time;
    $S_{CL}$ denotes a learned value for the fill time;
    $S_{CM\_OCP}$ denotes a marginal pre-fill time;
    $S_{CM}$ denotes a marginal time for the clutch fill time;
    $k_E$ denotes a correction coefficient for engine speed;
    $k_{T2}$ denotes a correction coefficient for fluid temperature; and
    $\Delta t_{F\_Pre}$ denotes a pre-fill time according to draining of the fluid, the pre-fill time being proportional to a period during which the engine remains stopped.

4. A method for controlling fluid supply to a clutch pack of an automatic transmission of a vehicle having an engine, the method comprising:
    detecting an operating state of a vehicle after an engine is restarted;
    determining if the operating state satisfies a pre-fill time control condition;
    controlling, when the operating state satisfies the pre-fill time control condition, fluid supply to a clutch pack of an automatic transmission on a basis of a pre-fill time calculated on a basis of the operating state;
    determining, during the controlling of the fluid supply to the clutch pack, if a pre-fill control release condition is satisfied; and
    stopping, when the pre-fill control release condition is satisfied, the controlling of the fluid supply to the clutch pack and performing normal hydraulic control of the transmission;
    wherein the pre-fill time control condition comprises:
        the automatic transmission being in a first speed for the first time after the engine is restarted; and
        a difference between fluid temperatures of before the engine is stopped and after the engine is restarted being greater than a predetermined difference.

5. The method of claim 4, wherein the pre-fill time control condition further comprises:
    the engine speed is greater than a predetermined engine speed;
    the engine speed is greater than a turbine speed;
    the output speed of the shift mechanism is greater than a predetermined output speed;
    the throttle valve opening is greater than a predetermined opening; and
    a malfunction of the vehicle is not detected.

6. The method of claim 5, wherein the pre-fill time is calculated on the basis of the equations:

$$1st\_Pre\_t_F = (S_C + S_{CL} - S_{CM\_OCP}) \times K_E \times K_{T2} + \Delta t_{F\_Pre};$$
    and
    $$nxt\_Pre\_t_F = (S_C + S_{CL} - S_{CM}) \times K_E \times K_{T2},$$

wherein:
    $1st\_Pre\_t_F$ denotes a first pre-fill time;
    $nxt\_Pre\_t_F$ denotes the next pre-fill time that occurs after the first pre-fill time;
    $S_C$ denotes a base fill time;

$S_{CL}$ denotes a learned value for the fill time;
$S_{CM\_OCP}$ denotes a marginal pre-fill time;
$S_{CM}$ denotes a marginal time for the clutch fill time;
$k_E$ denotes a correction coefficient for engine speed;
$k_{T2}$ denotes a correction coefficient for fluid temperature; and $\Delta t_{F\_Pre}$ denotes a pre-fill time according to draining of the fluid, the pre-fill time being proportional to a period during which the engine remains stopped.

* * * * *